United States Patent
Wöhrle et al.

(10) Patent No.: US 9,755,194 B2
(45) Date of Patent: Sep. 5, 2017

(54) METHOD FOR PRODUCING A BATTERY WITH A METALLIC HOUSING AND AN ELECTRICAL INSULATION LAYER COVERING THE OUTSIDE OF THE HOUSING, AND BATTERY PRODUCED BY THE METHOD

(75) Inventors: Thomas Wöhrle, München (DE); Wolfgang Duernegger, Schorndorf (DE)

(73) Assignees: Robert Bosch GmbH, Stuttgart (DE); Samsung SDI Co., Ltd., Yongin-si, Gyeonggi-do (KR)

(*) Notice: Subject to any disclaimer, the term of this patent is extended or adjusted under 35 U.S.C. 154(b) by 306 days.

(21) Appl. No.: 14/131,487

(22) PCT Filed: Jul. 9, 2012

(86) PCT No.: PCT/EP2012/063341
§ 371 (c)(1),
(2), (4) Date: Apr. 11, 2014

(87) PCT Pub. No.: WO2013/010830
PCT Pub. Date: Jan. 24, 2013

(65) Prior Publication Data
US 2014/0212738 A1 Jul. 31, 2014

(30) Foreign Application Priority Data
Jul. 18, 2011 (DE) ........................ 10 2011 079 289

(51) Int. Cl.
*H01M 2/02* (2006.01)

(52) U.S. Cl.
CPC ........... *H01M 2/02* (2013.01); *H01M 2/0202* (2013.01); *H01M 2/0237* (2013.01);
(Continued)

(58) Field of Classification Search
None
See application file for complete search history.

(56) References Cited

U.S. PATENT DOCUMENTS

| | | | | |
|---|---|---|---|---|
| 5,958,511 A | * | 9/1999 | Dolan | B05D 5/005 427/258 |
| 6,413,668 B1 | * | 7/2002 | Sandberg | H01M 2/0207 429/166 |

(Continued)

FOREIGN PATENT DOCUMENTS

| | | |
|---|---|---|
| CN | 1475037 A | 2/2004 |
| WO | 01/57941 A1 | 8/2001 |

OTHER PUBLICATIONS

International Search Report corresponding to PCT Application No. PCT/EP2012/063341, mailed Oct. 31, 2012 (German and English language document) (5 pages).

*Primary Examiner* — Ula C Ruddock
*Assistant Examiner* — Matthew Van Oudenaren
(74) *Attorney, Agent, or Firm* — Maginot, Moore & Beck LLP

(57) ABSTRACT

A method is disclosed for producing a battery with a metallic housing and an electrical insulation layer covering the outside of the housing. The method includes: providing a metallic housing or housing part for a battery; corona treating the outside of the housing or of the housing part, with simultaneous extraction of the gases and particles which arise; and applying the electrical insulation layer onto the treated outside of the housing or housing part.

7 Claims, 1 Drawing Sheet

(52) U.S. Cl.
CPC ....... *H01M 2/0267* (2013.01); *H01M 2/0275* (2013.01); *H01M 2/0277* (2013.01); *H01M 2/0285* (2013.01); *H01M 2/0292* (2013.01); *Y10T 29/49108* (2015.01); *Y10T 29/49114* (2015.01); *Y10T 29/49115* (2015.01)

(56) References Cited

U.S. PATENT DOCUMENTS

| | | | | |
|---|---|---|---|---|
| 6,785,113 | B1* | 8/2004 | Pham | H01T 19/00 138/162 |
| 2004/0142190 | A1* | 7/2004 | Kawai | B32B 15/08 428/461 |
| 2005/0069763 | A1* | 3/2005 | Hong | H01M 2/0212 429/185 |
| 2010/0221599 | A1* | 9/2010 | Sumihiro | H01M 2/027 429/174 |

* cited by examiner

METHOD FOR PRODUCING A BATTERY WITH A METALLIC HOUSING AND AN ELECTRICAL INSULATION LAYER COVERING THE OUTSIDE OF THE HOUSING, AND BATTERY PRODUCED BY THE METHOD

This application is a 35 U.S.C. §371 National Stage Application of PCT/EP2012/063341, filed on Jul. 9, 2012, which claims the benefit of priority to Ser. No. DE 10 2011 079 289.9, filed on Jul. 18, 2011 in Germany, the disclosures of which are incorporated herein by reference in their entirety.

The present disclosure relates to a method for producing a battery with a metallic housing and an electrical insulation layer covering the outside of the housing and to a battery produced by the method. The terms cell and battery and galvanic element are used synonymously in this document.

BACKGROUND

Batteries, in particular lithium-ion cells or batteries, have at least one positive electrode and negative electrode (cathode and anode) that allow the reversible insertion of lithium ions ($Li^+$) (intercalation) or their extraction again (deintercalation). Lithium-ion cells and batteries made up from them by being connected in parallel or in series have to meet stringent requirements in terms of safety, operating behavior and energy density.

According to the prior art, lithium-ion cells may be packaged in aluminum composite foil, known as pouch cells or soft packs, which in present-day technical terminology are also referred to as lithium-ion polymer cells or lithium polymer cells. Further possibilities for enclosing lithium-ion cells with a housing are purely metallic housings, also referred to as hard housings (hardcase housings). There are purely metallic housings of a cylindrical form and of a prismatic form. Purely metallic cell housings for lithium-ion cells, in which the housing must be at a potential, must be electrically insulated on the outside if they are made up as high-voltage batteries. Electrically puncture-proof adhesive tapes, for example polyester-based tapes with acrylic adhesive, or electrical insulating varnishes may be used for this purpose.

Various problems may occur in the adhesive attachment of the electrical insulating layer to the outer metal surface of the cell housing. For instance, there may be instances of detachment of the insulation layers, or inhomogeneities at the applied insulation layer. Moreover, metal particles that can mechanically damage the applied electrical insulation layer may also become attached to the metallic outer surface.

SUMMARY

The disclosure provides a method for producing a battery with a metallic housing and an electrical insulation layer covering the outside of the housing that overcomes or at least alleviates one or more problems of the prior art. The method comprises the steps of:
(i) providing a metallic housing or housing part for a battery;
(ii) corona treatment of the outside of the housing or housing part with simultaneous extraction of gases arising and particles; and
(iii) applying the electrical insulation layer to the treated outside of the housing or housing part.

The housing may consist of any desired metal or any desired metal alloy. For example, the housing may be produced from high-grade steel; in particular, however, the housing or housing part consists of aluminum or an aluminum alloy.

As is known, a corona treatment is a widely used electrochemical process for the surface modification of plastics, in which the surface is subjected to an high-voltage electrical discharge. Such a treatment generally has the effect that there is an increase in the wettability of surfaces and the chemical affinity, whereby the adhesive attachment to such surfaces is increased. It has surprisingly been found that, by means of corona treatment, the outer surface of metallic housings, in particular housings of aluminum, can be freed of any organic residues there may be and modified advantageously in respect of improving adhesion, and the surface tension can be set to a constant and uniform value. The latter is very important for uniform wetting and adhesive attachment of the electrical insulation layer on the metallic housing surface. It is surprising in particular that, even in the case of aluminum surfaces, in spite of the presence of a natural aluminum oxide layer, an improvement in the adhesion and wettability takes place as a result of corona treatment.

The corona pre-treatment is carried out in a way analogous to the application of the method in the area of plastics for improving adhesion. The term corona describes the color of the flash that occurs during the discharge. In principle, corona equipment contains two electrodes and additionally an insulator. When an alternating frequency of about 20 to 30 kHz and a voltage of about 25 to 30 kV are applied, the air becomes electrically conductive.

Metallic surfaces of housings or housing half-parts may still have organic residues, for example process oils, lubricating substances or release agents. Especially liquid process residues from previous working steps are very problematic for the adhesive attachment and application of a layer, even if they are only present in just a few molecular layers on a metallic surface, because they often have a barrier effect with respect to adhesive or the varnish applied. A series of physically and chemically induced interactions may occur, having effects on the formation of the layer or properties of the layer directly or after a time delay.

Direct interactions disturb the layer structure and the homogeneity of the layer. The wetting behavior and the adhesion of the layer are influenced by this. Chemical interactions between surfaces of adhering process fluids and the substrate of the layer may cause changes to layer-specific aspects of properties, which lead to changes directly (for example changes of the insulating properties) or in the long term of the substrate of the layer (for example discoloration, softening) or delamination. For functional layers especially, such changes must be prevented. For interconnected high-voltage batteries, such effects must be ruled out during the lifetime of the product, in order to ensure a reliable electrical insulation between the individual cells.

The precise surface chemistry during and after the corona treatment is so far unknown. It is presumed that, under the drastic conditions of the corona discharge, organic compounds are thoroughly burned or transformed by cracking into smaller volatile molecules or even into the surface of the housing.

In the case of a corona discharge, the surface tension is increased and brought to a uniform level. It has been possible to show that, after the corona treatment of the metallic housing surface, the adhesion with respect to an electrical insulation layer increases significantly, even over a relatively long period of time. By increasing the surface tension, the wettability of the metal surface during application of a varnish is also improved, whereby very uniform coating is achieved.

During the corona treatment, gases and any particles arising are extracted. The ozone produced during the electrical discharge is extracted. The extraction has the additional effect that the metal housing is cleaned of attached dust, metal particles or metal swarf or process substances that may occur during the working of the metal. The extraction during the corona treatment may therefore achieve the effect that metal particles which, as a result of the process, may be present on the metallic surface as contaminants are removed. As a result, a particularly homogeneous, planar and clean metal surface with increased chemical affinity with respect to applied layers is provided. Moreover, particles could partially damage the electrical insulation layer over a period of time.

Furthermore, it is preferred that the electrical insulation layer is a varnish.

Alternatively and likewise with preference, the electrical insulation layer is a film of plastic. The film of plastic preferably consists of a polyester, a polyimide or a polyolefin.

A further aspect of the disclosure concerns a battery, in particular a lithium-ion battery, that has been produced according to the previously described method. One way in which the batteries treated by the method according to the disclosure differ from untreated batteries is an increased surface tension in the region of the surface of the housing.

The positive effects of the corona treatment on the surface tension can be recorded, for example, by means of an ink test. It is carried out with what are known as "dyne test inks", which each have different surface tensions. Beginning with low surface tensions, the procedure is continued until the test ink no longer wets the surface.

A further test method is that of wetting angle measurement or contact angle measurement. This involves placing a drop of liquid on the housing surface and determining the wetting angle (contact angle) of the drop in comparison with the surface under strong magnification. The smaller the angle, the better the wetting.

BRIEF DESCRIPTION OF THE DRAWINGS

Exemplary embodiments of the disclosure are explained in more detail on the basis of the description that follows and the drawings, in which.

DETAILED DESCRIPTION

Figure 1:
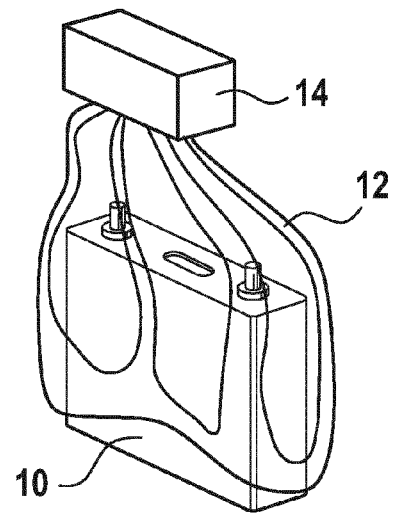
FIG. 1 shows a schematic representation of a corona treatment of a battery housing.

FIG. 1 shows in a highly schematized way the method step of the corona treatment of the outside of a housing 10 of a lithium-ion battery. The corona discharge 12 is produced here by means of the corona device 14.

In a test, the housing 10 was produced from a commercially available rolled aluminum sheet. The corona treatment then allowed the surface tension to be increased from 34 mN/m to 41 mN/m. The corona device 14 was in this case a commercially available handheld device, and the surface tensions were measured with what are known as test inks.

Figure 2:
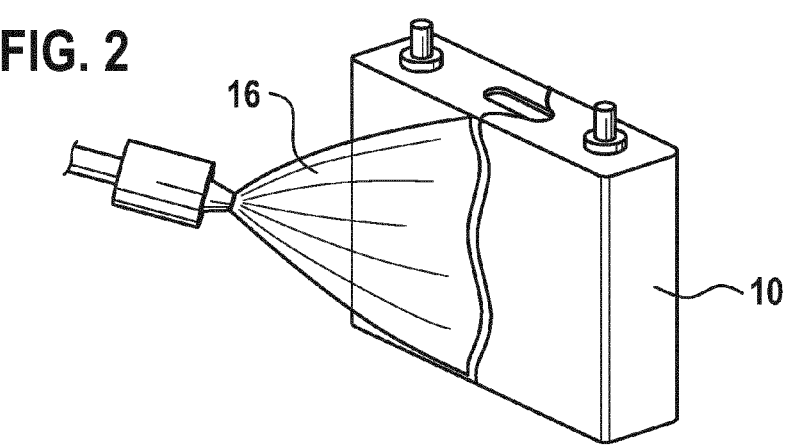
FIG. 2 shows a schematic representation of the application of an electrically insulating varnish to a treated battery housing.

After successful corona treatment, an electrical insulation layer was applied to the metallic housing 10. As represented in FIG. 2, this may take place for example by spraying on a varnish 16.

Figure 3:
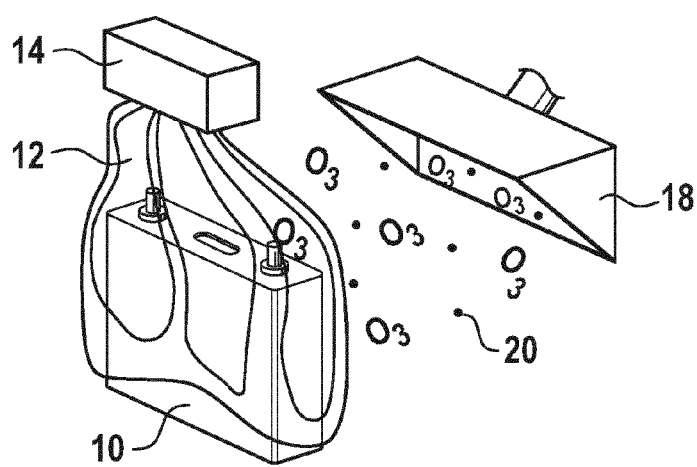
FIG. 3 shows a schematic representation of the corona treatment with simultaneous extraction of ozone and particles.

Simultaneously with the corona treatment, an extraction of ozone and other gases arising during the treatment and any small metal particles 20 from the surface of the housing 10 may take place with the aid of an extraction device 18 (see FIG. 3).

The quality of the adhesion of the insulation layer was assessed by peeling tests. The tested variant with an aluminum surface and an electrical insulating varnish showed greatly improved results with respect to adhesion and surface quality and had no coating defects. Since the tolerances of the electrical insulation coatings after corona treatment fluctuate within smaller tolerances than untreated surfaces, this makes it possible to dispense with insulating varnish.

Especially inhomogeneity of the coating, such as coating defects or instances of thinning, can lead to considerable problems in high-voltage applications if the voltage punctures regions where the layer thickness of the insulation is too thin and irreparably damages parts of the battery pack.

The invention claimed is:

1. A method for producing a battery with a metallic housing and an electrical insulation layer covering the outside of the housing, the method comprising:
   (i) providing a metallic housing or housing part for a battery;
   (ii) corona treating an outside of the housing or housing part with simultaneous extraction of gases arising and particles, the particles including one or more of metal particles, metal swarf, and process substances related to working of the metallic housing or housing part; and
   (iii) applying an electrical insulation layer to the treated outside of the housing or housing part, the electrical insulation layer consisting of a varnish.

2. The method as claimed in claim 1, wherein the housing or housing part is aluminum or an aluminum alloy.

3. A battery, comprising:
   a metallic housing or housing part for the battery; and
   an electrical insulation layer configured to cover an outside of the housing or housing part, the electrical insulation layer consisting of a varnish,
   wherein the outside of the housing or housing part is corona treated with simultaneous extraction of gases arising and particles, the particles including one or more of metal particles, metal swarf, and process substances related to working of the metallic housing or housing part.

4. The battery as claimed in claim 3, wherein the battery is a lithium-ion battery.

5. The method as claimed in claim 1, wherein corona treating the outside of the housing or housing part increases a surface tension of the outside.

6. The method as claimed in claim 1, wherein corona treating the outside of the housing or housing part brings a surface tension of the outside to a uniform level.

7. The method as claimed in claim 1, wherein corona treating the outside of the housing or housing part increases a surface tension of the outside by 21%.

* * * * *